United States Patent
Wang et al.

(10) Patent No.: US 7,571,427 B2
(45) Date of Patent: Aug. 4, 2009

(54) METHODS FOR COMPARING VERSIONS OF A PROGRAM

(75) Inventors: Zheng Wang, Cambridge, MA (US); Scott A. McFarling, Redmond, WA (US); Ken B. Pierce, Seattle, WA (US); Ramarathnam Venkatesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 944 days.

(21) Appl. No.: 10/874,676

(22) Filed: Jun. 24, 2004

(65) Prior Publication Data

US 2004/0230957 A1 Nov. 18, 2004

Related U.S. Application Data

(63) Continuation of application No. 09/712,063, filed on Nov. 14, 2000, now Pat. No. 6,954,747.

(51) Int. Cl.
*G06F 9/44* (2006.01)
*G06F 12/00* (2006.01)
(52) U.S. Cl. ...................... 717/122; 707/203
(58) Field of Classification Search ............ 706/1, 706/54; 707/1, 2, 3, 4, 5, 6, 7, 8, 200, 203, 707/205; 717/100, 101, 103, 118, 126, 135, 717/136, 140, 159, 161, 168, 170, 122; 705/54; 709/202, 223; 713/176
See application file for complete search history.

(56) References Cited

U.S. PATENT DOCUMENTS

| | | | | |
|---|---|---|---|---|
| 4,558,413 A | * | 12/1985 | Schmidt et al. | 707/203 |
| 6,148,298 A | * | 11/2000 | LaStrange et al. | 707/5 |
| 6,393,438 B1 | * | 5/2002 | Kathrow et al. | 707/203 |
| 6,954,747 B1 | * | 10/2005 | Wang et al. | 706/54 |
| 2004/0210885 A1 | * | 10/2004 | Wang et al. | 717/158 |

OTHER PUBLICATIONS

Whyman, Edward and Somers, Harold; "Evaluation Metrics for a Translation Memory System"; 1999; John Wiley & Sons, Ltd.; pp. 1-4.*
Whyman, Edward; "Evaluation Metrics for a Translation Memory System"; 1999; John Wiley & Sons, Ltd.; p. 1-4.*
Zhang, Xiaolan; "System Support for Automatic Profiling and Optimization"; 1997; ACM; p. 15.*

* cited by examiner

*Primary Examiner*—Wei Y Zhen
*Assistant Examiner*—Chih-Ching Chow
(74) *Attorney, Agent, or Firm*—Merchant & Gould; Ryan T. Grace

(57) ABSTRACT

Systems and methods are discussed that allow profile information to be reused by various versions of a program. One illustrative aspect includes a method for comparing versions of a program in binary format. The method includes finding equivalent contents in portions of two versions of the program, finding equivalent structure in the portions of the two versions, and forming a match when a portion of one of the two versions is an equivalence of a portion of the other of the two versions.

17 Claims, 6 Drawing Sheets

Fig. 9

| FUZZINESS LEVEL | NUMERICAL ADDRESS OFFSET | REGISTER ALLOCATION | BLOCK ADDRESS OPERAND | OPERAND | OPCODE |
|---|---|---|---|---|---|
| 0 | ALL | ALL | • TARGET BLOCK'S MATCH<br>• TARGET BLOCK'S EXTENDED NAME<br>• TARGET PROCEDURE NAME OR BRANCH OFFSET WITHIN PROCEDURE<br>• TARGET BLOCK'S DISTANCE FROM BEGINNING OF PROCEDURE | ALL | ALL |
| 1 | NONE | EAX/ECX/EDX: DEPENDENCY ONLY | SAME AS LEVEL 0 | ALL | ALL |
| 1A | SAME AS LEVEL 1, BUT INCLUDES ONLY THE LAST INSTRUCTION IN EACH BLOCK | | | | |
| 2 | NONE | EAX/ECX/EDX: DEPENDENCY ONLY | • TARGET BLOCK'S MATCH<br>• TARGET BLOCK'S EXTENDED NAME<br>• TARGET PROCEDURE NAME OR BRANCH OFFSET WITHIN PROCEDURE | ALL | ALL |
| 3 | NONE | EAX=ECX=EDX<br>EBX=EDI=ESI | TARGET PROCEDURE NAME OR BRANCH DIRECTION WITH PROCEDURE | NO IMMEDIATE NONE FOR RETURN | ALL |
| 3A | SAME AS LEVEL 3, BUT INCLUDES ONLY THE LAST INSTRUCTION IN EACH BLOCK | | | | |
| 4 | NONE | N/A | N/A | TYPE ONLY | ALL |
| 5 | NONE | N/A | N/A | NONE | GROUP | mental
METHODS FOR COMPARING VERSIONS OF A PROGRAM

CROSS-REFERENCE TO RELATED APPLICATIONS

This patent application is a continuation of U.S. patent application Ser. No. 09/712,063, entitled "Methods For Comparing Versions of a Program," filed on Nov. 14, 2000 now U.S. Pat. No. 6,954,747 and assigned to the same assignee as this application.

TECHNICAL FIELD

The technical field relates generally to program analysis. More particularly, it pertains to comparing one version of a program in binary format with another version of the program in binary format.

COPYRIGHT NOTICE-PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyright rights whatsoever. The following notice applies to the software and data as described below and in the drawings attached hereto: Copyright© 2000, Microsoft Corporation, All Rights Reserved.

BACKGROUND

A program is a list of statements. These statements are written by a programmer in a language that is readable by humans. This list of statements may be translated, through processes that include front-end compilation, to produce an executable file that can cause a computer to perform a desired action.

A program can be improved by using profile information. Profile information helps to characterize behaviors of a program. The effort to collect adequate profile information is rather time intensive. This situation is made worse when changes to a program require that profile information be collected all over again for the new version of the program. Not being able to collect profile information in a desired amount of time may lead to inferior programs and to the eventual lack of acceptance of such programs in the marketplace.

Thus, what is needed are systems, methods, and structures to reuse profile information in multiple versions of a program.

SUMMARY

Systems, methods, and structures for comparing versions of a program in binary format are discussed. An illustrative aspect includes a system for reusing profile information of a program. The system includes a comparator to define a match when a first value equals a second value. The system further includes a propagator to propagate profile information when a match is defined. And the system further includes a processing engine that processes a portion of a first version of the program to produce the first value and a portion of a second version of the program to produce the second value. The processing engine uses a set of information at a desired fuzziness level to produce the first value and the second value.

Another illustrative aspect includes a method for comparing versions of a program in binary format. The method includes finding equivalent contents in portions of two versions of the program. The method further includes finding equivalent structure in the portions of the two versions. And the method further includes forming a match when a portion of one of the two versions is an equivalence of a portion of the other of the two versions.

Another illustrative aspect includes a method for comparing versions of a program in binary format. The method includes finding equivalent procedures in a first version and a second version. The method further includes finding equivalent portions of data in equivalent procedures. And the method further includes finding equivalent portions of code in equivalent procedures.

Another illustrative aspect includes a method for comparing procedures in versions of a program. The method includes finding procedures having identical names, finding procedures by calculating one hash value based on the code, finding procedures having similar names, and finding procedures by comparing hash values for portions of procedures.

Another illustrative aspect includes a method for comparing data in a first version to a procedure in a second version of a program in binary format. The method includes finding equivalent portions of data using hash values and finding equivalent portions of data using positional information in the procedures.

Another illustrative aspect includes a method for comparing code in a procedure in a first version to a procedure in a second version of a program in binary format. The method includes finding equivalent portions of code using hash values and finding equivalent portions of code using control flow.

Another illustrative aspect includes a method for comparing code in versions of a program. The method includes hashing to form hash values from a set of information at a desired level. And the method further includes comparing the hash value of a portion of code in a first version to the hash value of a portion of code in a second version so as to define a match if the hash value of the portion of code in the first version equals the hash value of the portion of code in the second version.

BRIEF DESCRIPTION OF THE DRAWINGS

FIG. 9 is a table that shows various fuzziness levels that are used to create hash values according to one aspect of the invention.

DETAILED DESCRIPTION

Figure 1:
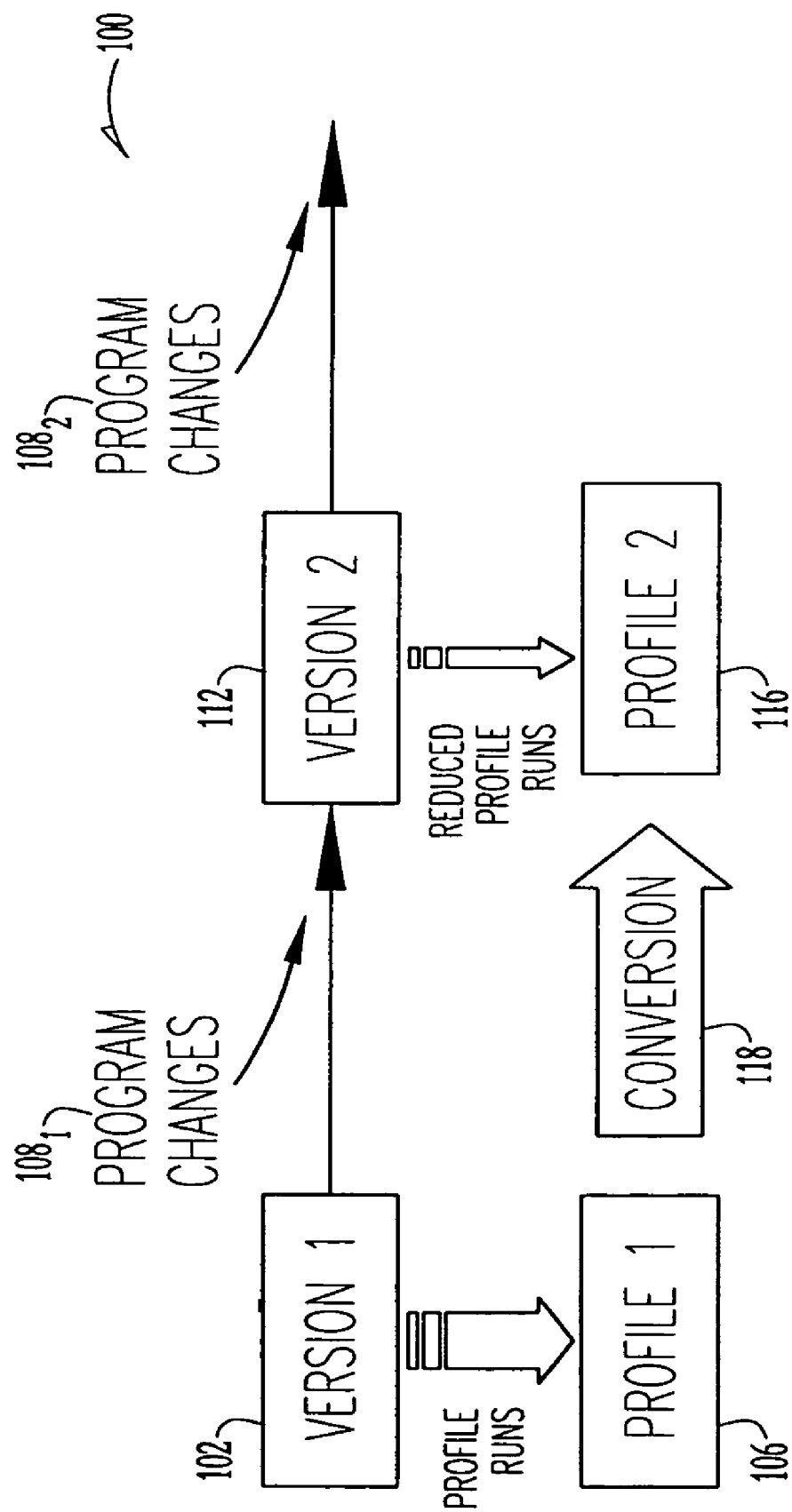
FIG. 1 is a system diagram that shows reusing profile information according to one aspect of the invention.

In the following detailed description of exemplary embodiments of the invention, reference is made to the accompanying drawings which form a part hereof, and in which is shown, by way of illustration, specific exemplary embodiments in which the invention may be practiced. In the drawings, like numerals describe substantially similar components throughout the several views. These embodiments are described in sufficient detail to enable those skilled in the art to practice the invention. Other embodiments may be utilized and structural, logical, electrical, and other changes may be made without departing from the spirit or scope of the present invention. The following detailed description is, therefore, not to be taken in a limiting sense, and the scope of the present invention is defined only by the appended claims.

FIG. 1 is a system diagram according to one aspect of the invention. A system 100 includes a version 102 of a program. The version 102 can be considered a particular executable file in binary format from a compilation of the program. The system 100 includes a profile 106. The profile 106 includes information collected from the version 102.

The system 100 includes another version of the program, version 112. Version 112 includes updates to version 102. The updates include certain program changes 108.

After the version 112 is produced, new profile information may need to be collected. There are several problems associated with collecting new profile information. First, the process of collecting profile information is time intensive; this hinders the ability to obtain desired profile information within a fixed amount of time. Second, the size and complexity of programs have increased with each generation of technology; this increases the need to obtain quality profile information to improve the programs. Third, the original development team, who has the expertise to collect profile information, may be dispersed after a program is shipped; this creates a void in the special knowledge needed to collect profile information when the program undergoes fixes over a period of time, such as several years.

Various embodiments of the invention solve these problems by reusing selected profile information, which was collected from other versions of the program, in the new version of the program. The various embodiments of the invention allow desired profile information, which is absent from other versions, to be collected for the new version. Thus, precious time can be focused on collecting the desired profile information for the new version of the program.

Returning to FIG. 1, the system 100 includes a conversion 118. The conversion 118 compares the version 102 to the version 112. The conversion 118 selectively transfers profile information from profile 106 to profile 116. For that profile information, which is desired but is absent from the profile 116, the system 100 allows the collecting of additional profile information to be incorporated in the profile 116.

Figure 2:
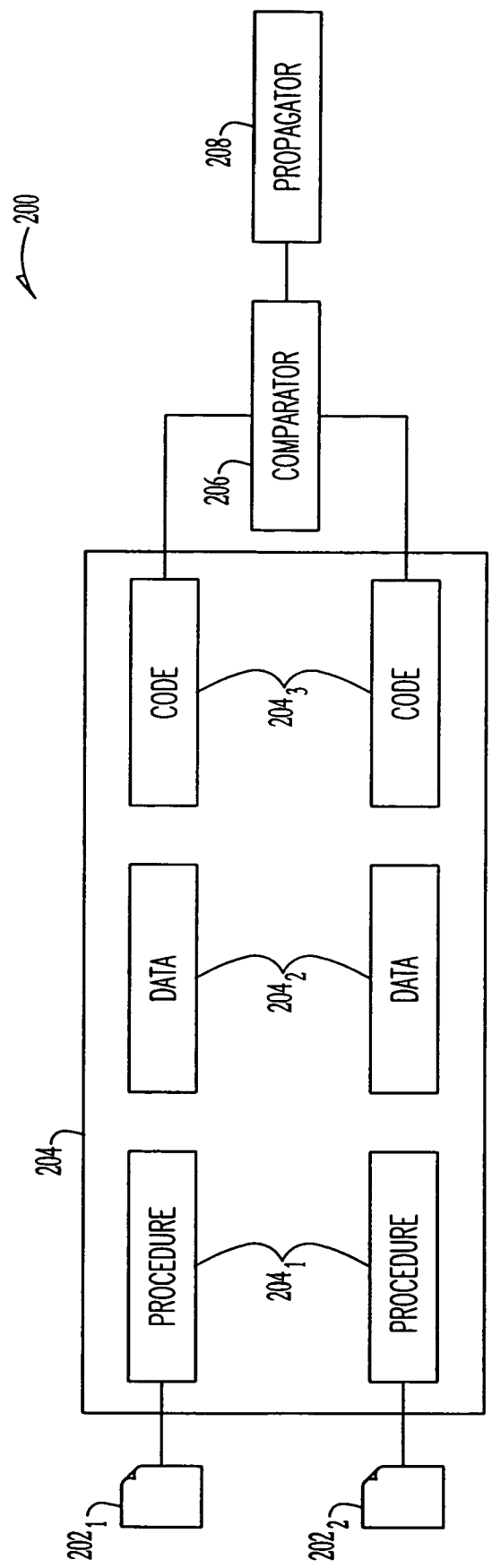
FIG. 2 is a system diagram that shows an engine for comparing two versions of a program according to one aspect of the invention.

FIG. 2 is a system diagram according to one aspect of the invention. A system 200 includes a first version $202_1$ of a program and a second version $202_2$ of the program. Both the first version $202_1$ and the second version $202_2$ are in binary format. Both the first version $202_1$ and the second version $202_2$ are input into the processing engine 204. The processing engine 204 processes a portion of the first version $202_1$ to produce a value. The processing engine 204 also processes a portion of the second version $202_2$ to produce another value. These values are used to determine whether profile information associated with the portion of the first version $202_1$ should be reused in the portion of the second version $202_2$. The processing engine 204 iterates the processing for all remaining portions of the first versions $202_1$ and all remaining portions of the second version $202_2$.

The first version $202_1$ and the second version $202_2$ are input into an engine $204_1$. The terms "first version" and "second version", as used hereinabove and hereinbelow, include versions that are created contemporaneously. In one embodiment, the term "first version" may be considered an older version and the term "second version" a newer version. The engine $204_1$ compares a procedure in the first version $202_1$ to find an equivalent procedure in the second version $202_2$. The term "procedure" means the inclusion of functions, methods, or any chunks of code that are named. Each procedure in the first version $202_1$ and the second version $202_2$ is assigned a value. If a value for a procedure in the first version $202_1$ equals a value for a procedure in the second version $202_2$, then a match is formed. This match indicates that the procedure in the second version $202_2$ is a candidate to reuse profile information from the profile information in the procedure in the first version $202_1$.

If a match is found between two procedures, the matching process undergoes a refinement. The engine $204_2$ compares a portion of data in the first version $202_1$ to find an equivalent portion of data in the second version $202_1$. Each portion of the data in the first version $202_1$ and the second version $202_2$ is assigned a value. The engine $204_2$ uses this value and positional information of the portion of data to determine a match.

The engine $204_3$ also helps to refine the match between two procedures. The engine $204_3$ compares a portion of code in the procedure in the first version $202_1$ to find an equivalent portion of code in the procedure in the second version $202_2$. Each portion of the code in the procedures in the first version $202_1$ and the second version $202_2$ is assigned a value. The engine $204_3$ uses this value and other information to determine a match. If there is a match, this also increases confidence that the procedure in the second version $202_2$ is a candidate to reuse profile information.

The system 200 includes a comparator 206. The processing engine 204 uses the comparator 206 to define a match between two values. The system 200 includes a propagator 208. The propagator 208 propagates profile information from the first version $202_1$ to the second version $202_2$ when a match is defined. The system 200 also includes an annotator (not shown). The annotator annotates the strength of each match so as to enhance the propagation of profile information. In other words, a user can specify profile information to be propagated for those matches that are at a desired strength.

Figure 3:
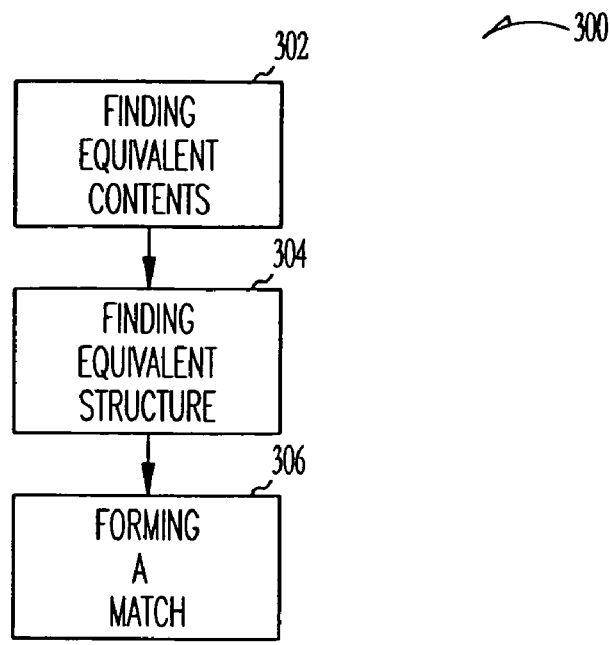
FIG. 3 is a process diagram that shows a technique for comparing two versions of a program according to one aspect of the invention.

FIG. 3 is a process diagram according to one aspect of the invention. A process 300 is a method for comparing multiple versions of a program in binary format. In reusing profile information, it is advantageous to determine whether portions of a first version of a program have equivalent portions in a second version of the program. Equivalent portions in the second version can be expected to execute in a manner similar to portions in the first version. Thus, profile information for the portions in the first version can be reused in the equivalent portions in the second version.

The process 300 helps to determine the equivalent portions. In various embodiments, the process 300 compares portions of a first version and a second version of a program in binary format. These portions include code blocks, which are basic blocks, and data blocks, which are defined according to how the data is accessed. Certain types of profile information are associated at a block level. Because the process 300 can compare portions of the first version and the second version in terms of blocks, propagation of profile information is made easier.

Figure 5:
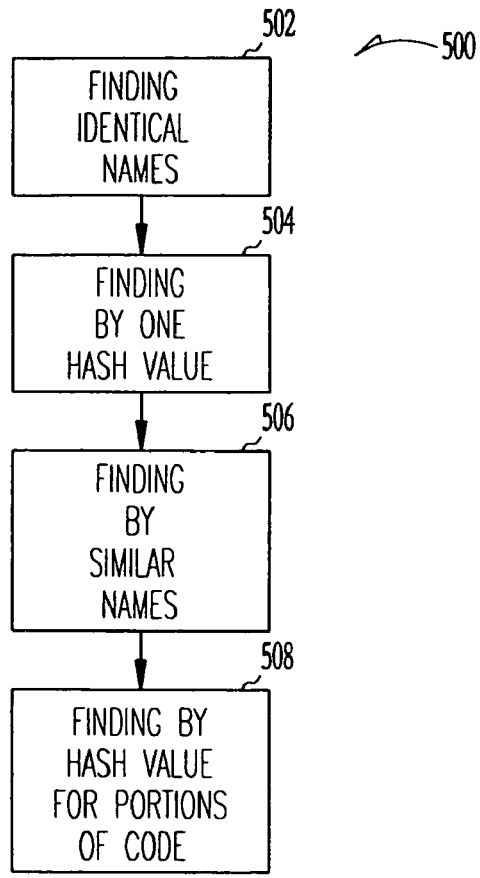
FIG. 5 is a process diagram that shows a technique for comparing procedures between two versions of a program according to one aspect of the invention.
Figure 6:
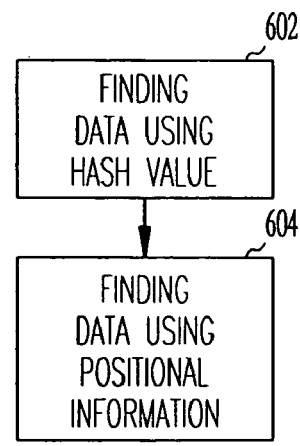
FIG. 6 is a process diagram that shows a technique for comparing data between two versions of a program according to one aspect of the invention.
Figure 7:
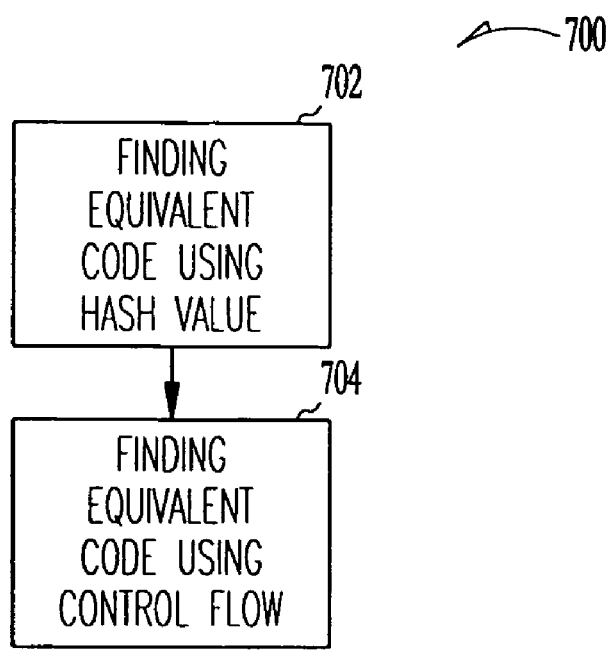
FIG. 7 is a process diagram that shows a technique for comparing code between two versions of a program according to one aspect of the invention.

The process 300 includes an act 302 for finding equivalent contents in the first version and the second version of the program. FIGS. 5, 6, and 7 illustrate an implementation of the act 302 for finding equivalent contents. Such an implementation does not limit the embodiments of the invention, and other implementations may be used. Because most portions of the first version remain the same or undergo little change in the portions of the second version, the act 302 enhances the efficiency of the comparing process.

The process 300 includes an act 304 for finding equivalent structure in the first version and the second version of the program. The process 300 includes an act 306 for forming a match when a portion of one version is an equivalence of a portion of the other version. In one embodiment, the act of forming a match includes forming a match when the portion of one version executes in a manner similar to the portion of the other version. The process 300 also uses a fuzzy match for portions of the first and second versions that have small differences. For other blocks that do not match, the process 300 may selectively use the results from both the acts 302 and 304 to form a match.

Figure 4:
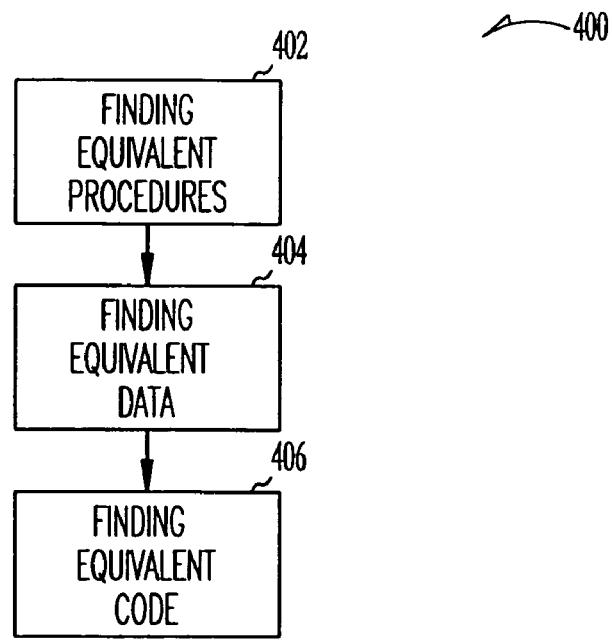
FIG. 4 is a process diagram that shows a technique for comparing two versions of a program according to one aspect of the invention.

FIG. 4 is a process diagram according to one aspect of the invention. A process 400 is a method for comparing multiple versions of a program in binary format. When a software designer modifies the source code of a program, the software designer may cause several changes when the source code is compiled to a file in a binary format. Such changes include code being added, deleted, or moved within a procedure. Other changes include changes to the instructions, such as operands and opcode, names of procedures, and types. These changes are defined as direct changes. Other changes are defined as indirect changes. Indirect changes are caused by a shift in the address space. Such changes affect targets of control flow instructions, pointers, register allocation, and others. Indirect changes may hinder the process of comparing. The process 400 helps to recognize indirect changes so as to enhance the comparing process.

The process 400 includes an act 402 for finding equivalent procedures in a first version of a program and in a second version of the program. The act 402 performs the comparison by using information selected from a group consisting of name information, type information, and code information.

The process 400 controls the complexity of the analysis by focusing on analyzing procedures. The process 400 recognizes that changes from one version to the next are likely to occur within procedural boundaries, and thus it is advantageous to start by looking at procedures in the various versions of the program.

The process 400 includes an act 404 for finding equivalent portions of data in equivalent procedures. The act 404 refines the act 402. FIG. 6 illustrates an implementation of the act 404 for finding equivalent portions of data. Such an implementation does not limit the embodiments of the invention, and other implementations may be used.

The process 400 includes an act 406 for finding equivalent portions of code in equivalent procedures. The act 406 finds equivalent portions of code between the first and the second versions by using a hash value. The hash value is calculated from the portions of code. The act 406 may also consider the ordering of the instructions in the calculation of the hash value. In one embodiment, the hash value is a 64-bit hash value, which is calculated for each basic block based on the opcodes and operands of the instructions within the basic block.

The act 406 finds equivalent portions of code by iterating the act of finding with different levels of matching fuzziness. This technique helps to deal with the indirect changes that can inject errors into the comparing process. Each level of matching fuzziness provides a desired tradeoff between being flexible to look past minor changes and being precise to identify correct matches. FIG. 9 illustrates an implementation of the different levels of matching fuzziness. Such an implementation does not limit the embodiments of the invention, and other implementations may be used.

FIG. 5 is a process diagram according to one aspect of the invention. A process 500 is a method for comparing procedures in multiple versions of a program. The process 500 includes an act 502 for finding procedures having identical names. The act 502 first looks for procedures with the identical extended name in a first version of the program and a second version of the program, and then the act 502 looks for procedures with the identical hierarchical name.

The term "extended name" means the name that is assigned by a compiler to a procedure that includes the hierarchical name, the parameter information, and return type information. The term "hierarchical name" means the name that defines the entire class hierarchy. For example, if foo is a class and foo has a method bar, the hierarchical name of bar is foo::bar.

The process 500 includes an act 504 for finding procedures by calculating one hash value based on the code of the procedures. The act 504 is executed when procedures cannot be matched by name. The hash value is calculated for each procedure based on the code blocks of the procedure. The calculation of the hash value accounts for the order of code blocks within the procedure. The act 504 may be iterated using different levels of fuzziness. FIG. 9 illustrates an implementation of the different levels of matching fuzziness. Such an implementation does not limit the embodiments of the invention, and other implementations may be used.

The process 500 includes an act 506 for finding procedures having similar names. The act 506 looks for procedures that have small differences in the hierarchical names. Then the act 506 calculates a hash value for each code block within the procedures. If the percentage is at a predetermined threshold for code blocks having equivalent hash values between the first and the second versions, the procedures are considered to be a match. A user may set the predetermined threshold.

The process 500 includes an act 508 for finding procedures by comparing hash values for portions of procedures between the first and the second versions. The act 508 calculates a hash value for each code block within the procedures. If the percentage is at a predetermined threshold for code blocks having equivalent hash values, the procedures can be considered to be a match. A user may set the predetermined threshold. This technique can define a match even when code blocks have been added or deleted from a procedure.

In one embodiment, the process 500 is executed in the following order: The act 502, the act 504, the act 506, and the act 508. However, the process 500 may be executed using any combination or sub-combination of acts 502, 504, 506, and 508.

FIG. 6 is a process diagram according to one aspect of the invention. A process 600 is a method for comparing data in a first version to a procedure in a second version of a program in binary format. The process 600 includes an act 602 for finding equivalent portions of data using hash values. The act 602 calculates a hash value for each portion of data. The act 602 then defines a match for each portion of data in the first version that has the same hash value as a portion of data in the second version.

The process 600 includes an act 604 to find equivalent portions of data using positional information in the procedures. The process 600 executes the act 604 for portions of data that cannot be matched using the act 602. In one embodiment, if portions of data are sandwiched by two pairs of matched portions of data, the process 600 defines them as a match. In one embodiment, the process 600 defines them as a match as long as their sizes do not differ by a predetermined threshold. The user may set the predetermined threshold.

Any technique for obtaining positional information may be used. In one embodiment, however, such positional information may be obtained as described in the following applications: U.S. Ser. No. 09/343,805 entitled "Translation and Transformation of Heterogeneous Programs", Ser. No. 09/343,298 entitled "Instrumentation and Optimization Tools for Heterogeneous Programs", Ser. No. 09/343,279 entitled "Shared Library Optimization for Heterogeneous Programs", Ser. No. 09/343,276 entitled "Application Program Interface for Transforming Heterogeneous Programs", and Ser. No. 09/343,287 entitled "Cross Module Representation of Heterogeneous Programs" (all filed on Jun. 30, 1999). These applications do not limit the embodiments of the invention and will not be discussed here in full.

The result of process 600 can be used to enhance a subsequent comparing process. For example, if two instructions refer to two portions of data that are already matched to each other, the two instructions can be considered a match even if the data addresses are different.

FIG. 7 is a process diagram according to one aspect of the invention. A process 700 is a method for comparing code in a procedure in a first version to a procedure in a second version of a program in binary format.

The process 700 includes an act 702 for finding equivalent portions of code using hash values. In one embodiment, the act 702 finds equivalent basic blocks based on the code contents and the positions of the basic blocks. The act 702 identifies a one-to-one match between a basic block in the first version and a basic block in the second version. The act 702 can be iterated at a desired level of fuzziness to find a match. FIG. 9 illustrates an implementation of the different levels of matching fuzziness. Such an implementation does not limit the embodiments of the invention, and other implementations may be used.

The process 700 includes an act 704 for finding equivalent portions of code using control flow. The process 700 selectively executes the act 704 for portions of code that cannot be matched by the act 702. The act 704 traverses down both versions of the procedure following the control flow. The act 704 uses conditional branches, jump instructions, return instructions, and previously matched blocks to pinpoint portions of code that can be considered equivalent in terms of control flow.

Figure 8:
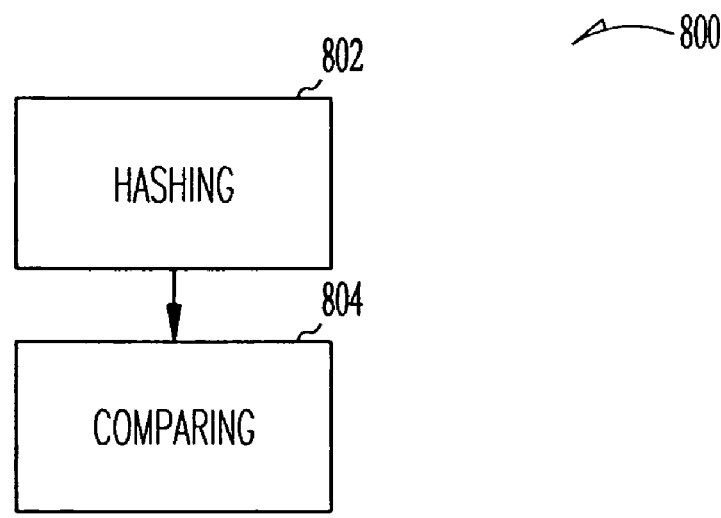
FIG. 8 is a process diagram that shows a hashing technique for comparing two versions of a program according to one aspect of the invention.

FIG. 8 is a process diagram according to one aspect of the invention. A process 800 is a method for comparing code in multiple versions of a program in binary format. The process 800 includes an act 802 for hashing to form hash values from a set of information at a desired level. The desired level can be considered to be a fuzzy level. Each level defines the strength of a filter. If the filter is weak, the process 800 will generate more matches between portions of code in a first version and portions of code in a second version of a program. If the filter is strong, the process 800 will generate matches that are more likely to be accurate. The strength of the filter is based on a set of information that is included or excluded. This set of information will be discussed hereinbelow.

The process 800 includes an act 804 for comparing the hash value of a portion of code in the first version to the hash value of a portion of code in the second version. The act 804 defines a match if the hash value of the portion of code in the first version equals the hash value of the portion of code in the second version. The process 800 includes iterating the act 802 to form hash values at another desired level and iterating the act 804 to compare the hash values. FIG. 9 illustrates an implementation of the different levels of matching fuzziness. Such an implementation does not limit the embodiments of the invention, and other implementations may be used.

For certain fuzzy levels, there can be several portions of code with the same hash value. For procedures with the same hash values, the act 804 defines a match by the order of appearance of procedures in the program and also when a desired percentage of portions of code in the procedure in the first version matches the portions of code in a procedure in the second version.

For basic blocks with the same hash values, the act 804 executes a two-phase process when multiple basic blocks have the same hash value. The first phase of the two-phase process includes defining a match that selectively limits cross-matching. A cross-matching occurs when a new match crosses an existing match. The existing match is a match between a first basic block in the first version and a second basic block in the second version; imagine a first line that is drawn to connect the first and second basic blocks together. The new match is a match between a third basic block in the first version and a fourth basic block in the second version; imagine a second line that is drawn to connect the third and fourth basic blocks together. If the second line crosses the first line, then a cross-matching exists. As will be discussed hereinbelow, cross-matching is inhibited depending on the level of fuzziness.

The second phase of the two-phase process includes propagating a match between two portions of code to other portions of code in the vicinity of the two portions of code using a neighbor test. A pair of blocks passes the neighbor test if their predecessors or their successors are matched to each other. This new match can then be propagated to more successors or predecessors. This process can be repeated until the propagation stops.

The process 800 includes annotating each match to form information for subsequent analysis. The information includes an indication of the strength of the match. This information can be used by a system to reuse profile information only for those matches that were matched at a desired strength.

FIG. 9 is a table according to one aspect of the invention. Table 900 defines various fuzziness levels and the set of information that is included in the various fuzziness levels. Recall that the strength of the filter for matching between versions of a program is based on a set of information that is included or excluded.

The set of information includes numerical address offsets. Numerical address offsets are numerical offsets in memory address operands. These offsets often change from build to build due to changes in data layout.

The set of information includes register allocation. A minor code change may cause different results of register allocation for the rest of a procedure. This affects registers that are included in the allocation by the compiler.

The set of information includes immediate operands. The set of information also includes block address operands. Block address operands appear in control flow instructions, such as jump, branch, and call; and in others, such as pointer operations. An instruction that contains these operands is defined as a source instruction. A portion of code, such as a basic block, which is referred to by the operands, is defined as a target block. The term "target block" means the inclusion of target basic block or target instruction. Undesirable indirect changes affect these operands.

Thus, a special technique may be used to form hash values to account for these indirect changes. The technique includes calculating a hash value by treating the operand in a block in one version of the program the same as the operand in a block in the other version of the program when the target block has previously been matched to another block. The technique includes formulating a hash value based on the extended name of the target block. The technique includes figuring a hash value based on the offset of the address of the target block from the beginning of a procedure and the offset of the address of the target block from the source instruction when the procedure contains both the target block and the source instruction. The technique includes determining a hash value based on the name of the procedure and the offset of the address of the target block from the beginning of the procedure when the procedure that contains the target block is different from another procedure that contains the source instruction. The technique may selectively execute the act of calculating, the act of formulating, the act of figuring, and the act of determining so as to inhibit errors arising in forming the hash value.

The set of information includes instruction opcode and operand types. For example, because of minor changes in the source code or the compilation process, a push word instruction may become a push double word instruction. As another example, a memory operand may become a register operand. As yet another example, a return instruction with no parameter may become a return with a parameter.

The set of information includes instructions that were added or removed. Again, the set of information forms the strength of the filter at various levels. Certain levels include more information to form the hash value. Other levels include less information to form the hash value. Certain levels allow accurate matches to be found for portions of code that have not changed or have only barely changed. Other levels allow matches to be found for portions of code that have changed considerably.

Returning to FIG. 9, each fuzziness level is now discussed. FIG. 9 illustrates an embodiment that has been implemented for processors that have X86 architecture. However, the invention is not limited to the X86 architecture and may include other processor architectures. Regarding level 0, all instruction opcodes and operands are included in the hashing. Level 0 can be used in procedure matching to find procedures that remain the same.

Regarding level 1, numerical address offsets are excluded from the hashing. Registers EAX, ECX, and EDX are converted to the same value for the calculation of the hash value. However, the dependency of these registers is retained in the calculation of the hash value. Regarding level 1a, the set of information is the same as level 1. However, the hash value reflects only the last instruction in each portion of code.

Regarding level 2, the address offset of the target block from the beginning of a procedure is excluded. This accommodates indirect changes that cause address shift for part of a procedure.

Regarding level 3, all immediate operands and operands of return instructions are excluded from the hashing. Registers EAX, ECX, and EDX are converted to the same value for the hashing calculation. Separately, registers EBX, EDI, and ESI are converted to the same value for the hashing calculation. Register dependency information is not included. The matching status and extended name of target blocks are not included. The address offset from a source instruction to a target block in the same procedure is reduced to +1 or −1 based on the branch direction, such as whether forward or backward. Regarding level 3a, the set of information is the same as level 3. However, the hash value reflects only the last instruction in each portion of code.

Regarding level 4, each instruction is hashed based on the opcode and the types (but not the contents) of the operands. Regarding level 5, each instruction is hashed based on the opcode only. Certain groups of opcodes are considered to be the same, such as push word and push double word, all conditional branch opcodes, and others.

Recall the discussion on cross-matching hereinabove. In one embodiment, at fuzziness level 1a, cross-matching is forbidden. In another embodiment, at fuzziness level 3, cross-matching is forbidden for blocks with three instructions or less. In another embodiment, at fuzziness level 3a, the first phase of the two-phase process is skipped. In another embodiment, at fuzziness levels 4 and 5, no matching may occur for blocks with one or two instructions, and no cross-matching may occur for blocks with three instructions.

In the various embodiments, the order in which different fuzziness levels is executed can be adjusted. Not all levels have to be used. Each level can be used more than once. In one embodiment, the comparing process performs the matching levels in increasing order of fuzziness. In another embodiment, the comparing process performs six passes during hashing-based procedure matching; this embodiment uses fuzziness levels in the order of 0, 1, 3, 1a, 5, and 3a. During basic block matching, the comparing process performs seven passes using fuzziness levels 1, 3, 2, 1a, 4, 3a, and 5.

CONCLUSION

Systems and methods have been described to reuse profile information in one version of a program in another version of a program. The techniques described hereinabove analyze the program in binary format without referring to changes made to the source code of the program. The techniques allow more time to collect profile information not found in the reused profile information.

Although the specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. It is to be understood that the above description is intended to be illustrative, and not restrictive. Combinations of the above embodiments and other embodiments will be apparent to those of skill in the art upon reviewing the above description. The scope of the invention includes any other applications in which the above structures and fabrication methods are used. Accordingly, the scope of the invention should only be determined with reference to the appended claims, along with the full scope of equivalents to which such claims are entitled.

We claim:

1. A computer-implemented method for propagating profile information from a first version of a program into a second version of a program, the method comprising:
   identifying a portion of the first version of the program, wherein the portion of the first version of the program is in a binary format;

identifying a portion of the second version of the program, wherein the portion of the second version of the program is in a binary format;

determining whether the portion of the first version of the program is equivalent to the portion of the second version of the program;

reusing preexisting profile information from the first version of the program for the second version of the program when the portion of the first version of the program is equivalent to the portion of the second version of the program, wherein the preexisting profile information includes the execution characteristics of the portion of the first version during runtime;

when the portion of the first version of the program is not equivalent to the portion of the second version of the program, determining whether the portion of the first version of the program matches the portion of the second version of the program according to a fuzziness level, wherein the fuzziness level includes at least one member of a group comprising: a fuzziness level having opcodes and operands included in the fuzziness level, a fuzziness level having address offsets excluded from the fuzziness level, a fuzziness level having an address offset from a beginning of a target block excluded from the fuzziness level, a fuzziness level having immediate operands and operands of return instructions excluded from the fuzziness level, a fuzziness level having opcode and types of operands included in the fuzziness level, and a fuzziness level having only opcode included in the fuzziness level, reusing preexisting profile information from the first version of the program for the second version of the program when the portion of the first version of the program matches the portion of the second version of the program according to the fuzziness level, wherein the preexisting profile information includes the execution characteristics of the portion of the first version during runtime, and when the portion of the first version of the program does not match the portion of the second version of the program according to the fuzziness level, collecting new profile information for the portion of the second version of the program.

2. The computer-implemented method of claim 1, wherein identifying the portion of the first version of the program includes converting the portion of the first version of the program into a value, wherein identifying the portion of the second version of the program includes converting the portion of the second version of the program into a value.

3. The computer-implemented method of claim 2, wherein the value of the portion of the first version of the program is a hash value, wherein the value of the portion of the second version of the program is a hash value.

4. The computer-implemented method of claim 3, wherein determining whether the hash value of the portion of the first version of the program matches the hash value of the portion of the second version of the program according to a fuzziness level includes iteratively determining whether the hash value of the portion of the first version of the program matches the hash value of the portion of the second version of the program according to a plurality of fuzziness levels.

5. The computer-implemented method of claim 1, wherein the fuzziness level is a user defined fuzziness level.

6. The computer-implemented method of claim 1, wherein the portion of the first version of the program is a procedure of the first version of the program, wherein the portion of the second version of the program is a procedure of the second version of the program.

7. A computer-readable storage medium having computer executable instructions for propagating profile information from a first version of a program into a second version of a program, the instructions comprising:

identifying a portion of the first version of the program;

identifying a portion of the second version of the program;

determining whether the portion of the first version of the program matches the portion of the second version of the program according to a fuzziness level, wherein the fuzziness level includes at least one member of a group comprising: a fuzziness level having opcodes and operands included in the fuzziness level, a fuzziness level having address offsets excluded from the fuzziness level, a fuzziness level having an address offset from a beginning of a target block excluded from the fuzziness level, a fuzziness level having immediate operands and operands of return instructions excluded from the fuzziness level, a fuzziness level having opcode and types of operands included in the fuzziness level, and a fuzziness level having only opcode included in the fuzziness level; and reusing preexisting profile information from the first version of the program for the second version of the program when the portion of the first version of the program matches the portion of the second version of the program according to the fuzziness level, wherein the preexisting profile information includes the execution characteristics of the portion of the first version during runtime.

8. The computer-readable storage medium of claim 7, wherein identifying the portion of the first version of the program includes converting the portion of the first version of the program into a value, wherein identifying the portion of the second version of the program includes converting the portion of the second version of the program into a value.

9. The computer-readable storage medium of claim 8, wherein the value of the portion of the first version of the program is a hash value, wherein the value of the portion of the second version of the program is a hash value.

10. The computer-readable storage medium of claim 9, wherein determining whether the hash value of the portion of the first version of the program matches the hash value of the portion of the second version of the program according to a fuzziness level includes iteratively determining whether the hash value of the portion of the first version of the program matches the hash value of the portion of the second version of the program according to a plurality of fuzziness levels.

11. The computer-readable storage medium of claim 7, wherein the fuzziness level is a user defined fuzziness level.

12. The computer-readable storage medium of claim 7, wherein the portion of the first version of the program is a procedure of the first version of the program, wherein the portion of the second version of the program is a procedure of the second version of the program.

13. A system for propagating profile information from a first version of a program into a second version of a program, the system comprising:

a processor; and a memory having computer executable instruction, wherein the computer-executable instructions are configured for:

identifying a portion of the first version of the program;

identifying a portion of the second version of the program;

determining whether the portion of the first version of the program matches the portion of the second version of the program according to a fuzziness level, wherein the fuzziness level includes at least one member of a group comprising: a fuzziness level having opcodes and operands included in the fuzziness level, a fuzziness level having address offsets excluded from the fuzziness level, a fuzziness level having an address offset from a beginning of a target block excluded from the fuzziness level, a fuzziness level having immediate operands and operands of return instructions excluded from the fuzziness level, a fuzziness level having opcode and types of operands included in the fuzziness level, and a fuzziness level having only opcode included in the fuzziness level; and reusing preexisting profile information from the first version of the program for the second version of the program when the portion of the first version of the program matches the portion of the second version of the program according to the fuzziness level, wherein the preexisting profile information includes the execution characteristics of the portion of the first version during runtime.

14. The system of claim 13, wherein identifying the portion of the first version of the program includes converting the portion of the first version of the program into a value, wherein identifying the portion of the second version of the program includes converting the portion of the second version of the program into a value.

15. The system of claim 14, wherein the value of the portion of the first version of the program is a hash value, wherein the value of the portion of the second version of the program is a hash value.

16. The system of claim 15, wherein determining whether the hash value of the portion of the first version of the program matches the hash value of the portion of the second version of the program according to a fuzziness level includes iteratively determining whether the hash value of the portion of the first version of the program matches the hash value of the portion of the second version of the program according to a plurality of fuzziness levels.

17. The system of claim 13, wherein the fuzziness level is a user defined fuzziness level.

* * * * *